United States Patent
Benisty et al.

(10) Patent No.: US 11,188,239 B2
(45) Date of Patent: Nov. 30, 2021

(54) HOST-TRUSTED MODULE IN DATA STORAGE DEVICE

(71) Applicant: Western Digital Technologies, Inc., San Jose, CA (US)

(72) Inventors: Shay Benisty, Beer Sheva (IL); Alon Marcu, Tel Mond (IL); Judah G. Hahn, Ofra (IL)

(73) Assignee: Western Digital Technologies, Inc., San Jose, CA (US)

(*) Notice: Subject to any disclaimer, the term of this patent is extended or adjusted under 35 U.S.C. 154(b) by 69 days.

(21) Appl. No.: 16/368,092

(22) Filed: Mar. 28, 2019

(65) Prior Publication Data
US 2020/0310661 A1    Oct. 1, 2020

(51) Int. Cl.
*G06F 3/06* (2006.01)

(52) U.S. Cl.
CPC .......... *G06F 3/0622* (2013.01); *G06F 3/0637* (2013.01); *G06F 3/0659* (2013.01); *G06F 3/0679* (2013.01)

(58) Field of Classification Search
CPC .... G06F 3/0622; G06F 3/0659; G06F 3/0637; G06F 3/0679; G06F 12/0246; G06F 3/0688; G06F 3/061; G06F 13/1663; G06F 13/36; G06F 2009/45579
See application file for complete search history.

(56) References Cited

U.S. PATENT DOCUMENTS

| | | | |
|---|---|---|---|
| 6,959,367 B2 | 10/2005 | Banno | |
| 9,092,362 B1* | 7/2015 | Alcantara | G06F 11/10 |
| 9,195,530 B1* | 11/2015 | Jean | G06F 11/16 |
| 9,448,745 B2 | 9/2016 | Alcantara et al. | |
| 2015/0178187 A1* | 6/2015 | Sheffler | H05K 999/99 |
| | | | 711/155 |
| 2017/0052721 A1 | 2/2017 | Yamaji | |
| 2017/0076106 A1* | 3/2017 | Keidar | G06F 21/629 |
| 2017/0123921 A1* | 5/2017 | Ptak | G06F 3/061 |
| 2017/0359338 A1* | 12/2017 | Tschofenig | H04L 63/0853 |

FOREIGN PATENT DOCUMENTS

JP    2011159226 A    8/2011

OTHER PUBLICATIONS

Schellekens et al., "Embedded Trusted Computing with Authenticated Non-volatile Memory"; International Conference on Trusted Computing; Mar. 2008; 15 pages.

* cited by examiner

*Primary Examiner* — Zhuo H Li
(74) *Attorney, Agent, or Firm* — Barry IP Law, P.C.

(57) ABSTRACT

A Data Storage Device (DSD) includes a Non-Volatile Memory (NVM) for storing data. A processor of the DSD receives a command from a host to access data in the NVM, and performs the command to access data in the NVM. The DSD further includes a host-trusted module functionally isolated from at least a portion of the DSD. The host-trusted module is configured to receive an instruction from the host, and perform an operation based on the instruction. According to one aspect, the operation includes a predetermined atomic operation to modify data stored in the NVM.

22 Claims, 6 Drawing Sheets

HOST-TRUSTED MODULE IN DATA STORAGE DEVICE

BACKGROUND

Atomic operations, such as a read-modify-write operation, test-and-set operation, fetch-and-add operation, and compare-and-swap operation, typically involve reading a memory location in a Data Storage Device (DSD) and writing a new value to the memory location. Such atomic operations can, for example, prevent race conditions in multi-threaded applications where different threads attempt to access the same memory location at the same time. In this regard, atomic operations may be used to implement mutual exclusion objects (i.e., mutexes) and resource availability signaling (i.e., semaphores), or non-blocking synchronization so that threads can take turns sharing a resource, such as a memory location. In some cases, read-modify-write operations can include conditional or non-conditional counter increment and decrement operations or may be associated with Redundant Array of Independent Disks (RAID) levels that perform write operations as an atomic read-write-modify write sequence, such as in RAID 4, RAID 5, and RAID 6.

The foregoing atomic operations are conventionally managed by a host, which involves synchronization by the host and transferring data from and back to a DSD that includes the memory location. For example, semaphore and database management such as XOR operations and conditional or non-conditional counter increments and decrements typically involve the host queuing a read command to the DSD. The DSD then reads the data from the memory location and transfers it to the host's main memory and posts a completion message to the host. The host then reads the data from its main memory and modifies the data (e.g., performs an XOR operation, increment or decrement operation), and writes the modified data back to the host's main memory. The host then queues a write command to the DSD. The DSD reads the modified data from the host's main memory, writes the modified data to the memory location in the DSD, and posts a completion notice to the host. However, the foregoing sequence of performing an atomic operation can introduce delay in the communication and synchronization between the host and the DSD and can increase data traffic between the host and the DSD.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

System Environment Examples

Figure 1:
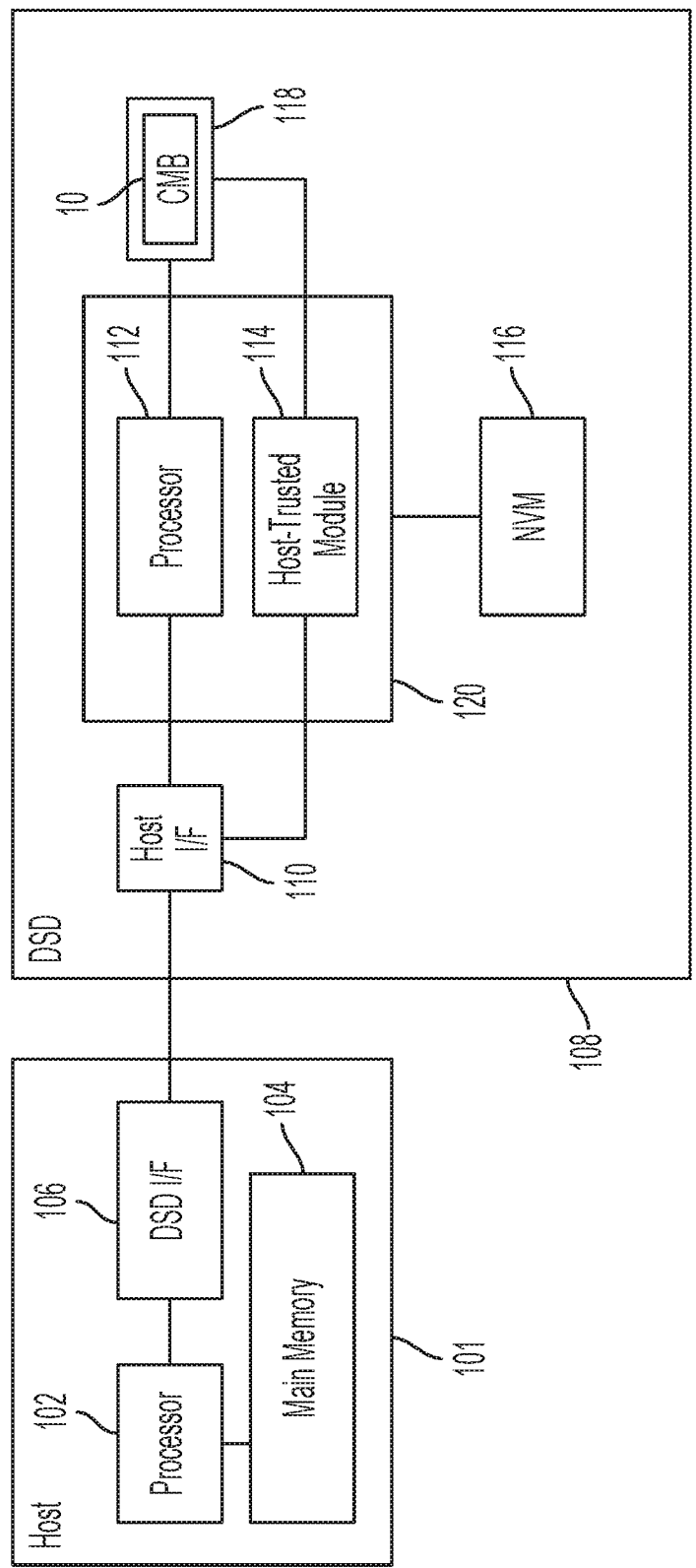
FIG. 1 is a block diagram of a host and a Data Storage Device (DSD) according to an embodiment.

FIG. 1 is a block diagram of host 101 and Data Storage Device (DSD) 108 according to an embodiment. Host 101 communicates with DSD 108 to retrieve data from and store data in DSD 108. In the example of FIG. 1, host 101 is separate from DSD 108, and may include, for example, a server, client, a Single Board Computer (SBC), or other computer system located remotely or co-located with DSD 108. In some implementations, host 101 may be housed together with DSD 108 as part of a single electronic device, such as, for example, a desktop, laptop or notebook computer or another type of electronic device such as a tablet, smartphone, network media player, portable media player, or Digital Video Recorder (DVR). As used herein, a host can refer to a device that is capable of issuing commands to DSD 108 to access data stored in DSD 108. In this regard, host 101 may include another DSD such as a smart DSD that is capable of executing applications and communicating with other DSDs.

As shown in FIG. 1, host 101 includes processor 102, main memory 104, and DSD interface (I/F) 106. Processor 102 can execute instructions, such as instructions from Operating System (OS) or application executing at host 101. Processor 102 can include circuitry such as a microcontroller, a Digital Signal Processor (DSP), an Application-Specific Integrated Circuit (ASIC), a Field Programmable Gate Array (FPGA), hard-wired logic, analog circuitry and/or a combination thereof. In some implementations, processor 102 can include a System on a Chip (SoC), which may be combined with one or both of main memory 104 and DSD interface 106.

Main memory 104 can be used by host 101 to store data used by processor 102. Data stored in main memory 104 can include instructions loaded from DSD 108 for execution by processor 102, and/or data used in executing instructions from applications or an OS of host 101. In some implementations, main memory 104 can be a volatile memory, such as a Dynamic Random Access Memory (DRAM).

DSD interface 106 is configured to interface host 101 with DSD 108, and may communicate with DSD 108 using a standard such as, for example, Serial Advanced Technology Attachment (SATA), PCI express (PCIe), Small Computer System Interface (SCSI), Serial Attached SCSI (SAS), Ethernet, Fibre Channel, or WiFi. In this regard, host 101 and DSD 108 may not be physically co-located and may communicate over a network such as a Local Area Network (LAN) or a Wide Area Network (WAN), such as the internet. In addition, DSD interface 106 may also interface with DSD 108 using a logical interface specification such as Non-Volatile Memory express (NVMe) or Advanced Host Controller Interface (AHCI) that may be implemented by a DSD driver executing at host 101. As will be appreciated by those of ordinary skill in the art, DSD interface 106 can be included as part of processor 102.

As shown in FIG. 1, DSD 108 includes host interface (I/F) 110, controller 120, Non-Volatile Memory (NVM) 116, and Random Access Memory (RAM) 118. Host interface 110 is configured to interface with host 101 and may communicate with host 101 using a standard such as, for example, SATA, PCIe, SCSI, SAS, Ethernet, Fibre Channel, or WiFi. Controller 120 can include circuitry for executing instructions, such as instructions from DSD firmware. In this regard, controller 120 includes processor 112 for executing instructions. Processor 112 can include a microcontroller, a DSP, an ASIC, an FPGA, hard-wired logic, analog circuitry and/or a combination thereof. In some implementations, controller 120 can include an SoC, which may be combined with host interface 110, for example.

In addition, controller 120 includes host-trusted module 114 that is embedded in DSD 108, but functionally isolated from at least a portion of DSD 108. As discussed in more detail below, host-trusted module 114 is configured to receive instructions from host 101 via host interface 110 or another interface, such as a General Purpose Input/Output (GPIO) pin, and perform one or more operations based on the instruction, such as one or more predetermined or pre-programmed atomic operations to modify data stored in NVM 116. In some implementations, host-trusted module 114 can include a Reduced Instruction Set Computer (RISC), such as a RISC-V processor or an Advanced RISC Machines (ARM) processor, or a type of open source processor. Additionally or alternatively, host-trusted module 114 may be configured to execute a high-level code, such as Java, running in a sandbox or to execute a preconfigured service, such as an XOR operation, increment or decrement operation, or transfer variable operation, installed during manufacture of DSD 108.

As discussed in more detail below, the use of a host-trusted module in a DSD, such as host-trusted module 114, to perform one or more predefined operations can ordinarily improve the performance of such operations and reduce the amount of data traffic transferred between the host and DSD. In more detail, such operations can be performed locally at DSD 108 without having to transfer data read from a memory location of DSD 108 (e.g., a memory location in NVM 116) to host 101 for modification, and a subsequent transfer of the modified data from host 101 to DSD 108 to write the modified data back to the memory location.

Host-trusted module 114 is exposed to host 101, so DSD 108 can protect itself from error-causing behavior from host 101 by including logic for security, protection and isolation of host-trusted module 114. In this regard, host-trusted module 114 can be functionally isolated from at least a portion of DSD 108, such as one or more registers of processor 112 and/or one or more memory locations in NVM 116 by processor 112 monitoring requests to access resources of DSD 108 from host-trusted module 114, and blocking access as needed to one or more components of DSD 108.

Host-trusted module 114 may be trusted by host 101 in that it can be configured to use a secure communication or authentication with host 101. For example, host-trusted module 114 may use at least one of mutual authentication with host 101 and session authentication for communication between host 101 and host-trusted module 114. In this regard, mutual authentication and/or session establishment can be required to gain a certain level of access and capabilities of host 101, such as kernel level access to an OS of host 101 or access to main memory 104 for obtaining data and/or instructions for performing an operation. A session information token may be used with each transaction to ensure protection. In addition, some host events, such as entering a sleep mode and/or a reset event, may invalidate some or all of the sessions between host-trusted module 114 and host 101.

DSD 108 includes NVM 116 for non-volatilely storing data. For example, DSD 108 can include one or more solid-state memories for NVM 116, so that DSD 108 is considered a Solid-State Drive (SSD) or a memory card, such as a Secure Digital (SD) memory card. In other examples, DSD 108 can include one or more rotating magnetic disks for NVM 116, so that DSD 108 is considered a Hard Disk Drive (HDD). In yet other examples, DSD 108 can include a combination of storage media types for NVM 116, such as where DSD 108 is a Solid-State Hybrid Drive (SSHD) that includes a rotating magnetic disk and a solid-state memory for NVM 116.

While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistive RAM (RRAM), NAND memory (e.g., Single-Level Cell (SLC) memory, Multi-Level Cell (MLC) memory (i.e., two or more levels), or any combination thereof), NOR memory, EEPROM, Ferroelectric Memory (FeRAM), Magnetoresistive RAM (MRAM), other discrete NVM chips, or any combination thereof.

As shown in FIG. 1, DSD 100 includes RAM 118, which can include, for example, a volatile RAM such as Dynamic RAM (DRAM) or Static RAM (SRAM), a non-volatile RAM, or other solid-state memory, such as a flash memory. RAM 118 can be used by controller 120 to store data used by controller 120. Data stored in RAM 118 can include data read from NVM 116, data to be stored in NVM 116, instructions loaded from a firmware of DSD 108 for execution by controller 120, and/or data used in executing a firmware for DSD 108.

In the example of FIG. 1, RAM 118 stores Controller Memory Buffer (CMB) 10 that host-trusted module 114 may use to modify or otherwise perform an operation based on an instruction received from host 101. CMB 10 is a buffer that can be fully allocated to one or more hosts, such as host 101. CMB 10 can be mapped in a memory space of host 101, with host 101 being able to send read and write requests to CMB 10. In some implementations, host 101 is allowed to locate any data in CMB 10, such as host submission and completion queues, buffer pointers, and data buffers. For example, host 101 may queue a read command in CMB 10 for DSD 108 to perform, and the read command may be performed in NVM 116 with the read data being stored in CMB 10 for host 101 to access. Similarly, for a write command to write data in NVM 116, host 101 can write data to CMB 10 for DSD 108 to perform the write command in NVM 116. In other implementations, host-trusted module 114 can include its own memory, such as SRAM, for performing operations based on instructions received from host 101.

In some implementations, host-trusted module 114 may only be allowed to access CMB 10. Host-trusted module 114 can modify the content of CMB 10 to avoid transferring data to host 101. When CMB 10 is implemented in a flash memory, host 101 or host-trusted module 114 may request to actively erase data stored in CMB 10 after an operation is completed.

Those of ordinary skill in the art will appreciate that other implementations of host 101 and DSD 108 in FIG. 1 can include a different arrangement of components, modules, or data structures. For example, other implementations can include a different number of host-trusted components, as in the example of FIG. 5. As another example, CMB 10 may instead be stored in a memory of host-trusted module 114.

Figure 2:
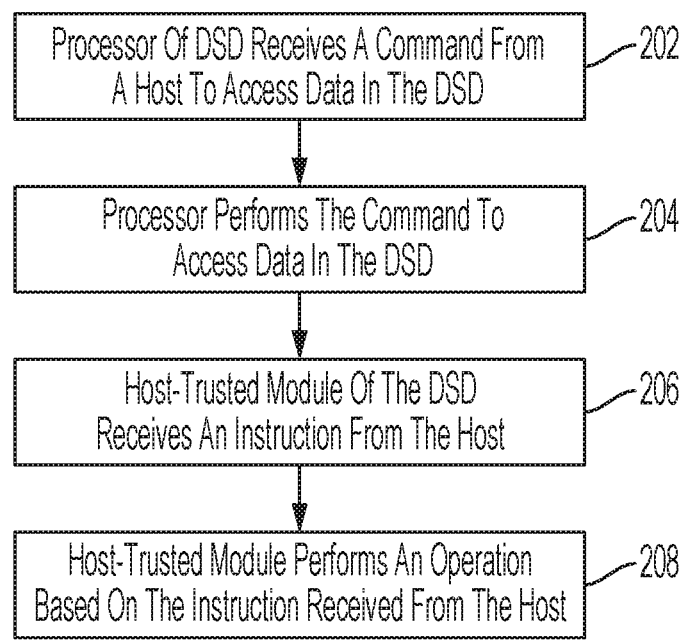
FIG. 2 is a flowchart for an instruction performance process for a host-trusted module of a DSD according to an embodiment.

FIG. 2 is a flowchart for an instruction performance process for a host-trusted module of a DSD according to an embodiment. The process of FIG. 2 can be performed by a DSD including one or more host-trusted modules, such as DSD 108 in the example of FIG. 1. As discussed in more detail below, the instruction performance process of FIG. 2 can ordinarily allow for a host-trusted module of a DSD to perform an operation, such as a predetermined atomic operation, at the DSD based on an instruction received from a host that would otherwise be performed at the host. This can improve the performance of operations, such as atomic operations, that can include, for example, a read-modify-write operation, test-and-set operation, fetch-and-add operation, and compare-and-swap operation, or other operations such as an XOR operation or an arithmetic operation.

In block 202, a processor of the DSD (e.g., processor 112 in FIG. 1) receives a command from a host to access data in the DSD, such as data stored in an NVM (e.g., NVM 116 in FIG. 1). The commands can include read commands to return data read from one or more memory locations in the NVM and/or commands to write data to one or more memory locations in the NVM. The commands may include, for example, one or more logical addresses used by the host (e.g., Logical Block Addresses (LBAs)) corresponding to the data to be read or written in the NVM.

In block 204, the processor of the DSD performs the command to access the data in the DSD. In the case of a read command, the processor accesses the requested data from the NVM and may buffer the data in a memory of the DSD (e.g., RAM 118 in the example of FIG. 1), and return the requested data to the host via a host interface of the DSD (e.g., host interface 110 in FIG. 1). In the case of a write command, the processor of the DSD may buffer write data included with the received command in the memory before writing the buffered data in the NVM.

In block 206, a host-trusted module of the DSD (e.g., host-trusted module 114) receives an instruction from the host. The instruction may be received via a host interface of the DSD (e.g., host interface 110) or another input of the DSD, and may include, for example, a vendor specific command sent by a driver executing at host 101 to perform a particular operation or service provided by host-trusted module 114. In contrast to the command received in block 202 to access data stored in the DSD (i.e., to write data or read data in the DSD), the instruction received by the host-trusted module in block 206 is to perform one or more operations or modifications on data stored in the DSD.

In some implementations, the instruction may follow a mutual authentication between the host and host-trusted module and/or a session establishment. In this regard, a session information token may be used with each instruction. The instruction may, for example, include a logical address and an indication of the operation or operations to be performed, such as one or more of a read-modify-write operation, test-and-set operation, fetch-and-add operation, and compare-and-swap operation, or other operations such as an XOR operation, an increment or decrement operation, a value transfer operation, and an arithmetic operation.

In some implementations, the instruction can include a pointer to a location in a main memory of the host (e.g., main memory 104 in FIG. 1) that stores data for performing the instruction. In such implementations, the host may queue a download command in its main memory for the host-trusted module that includes the instruction and/or data to be used by the host-trusted module in performing one or more operations for the instruction. In some cases, the host may provide an indication to the host-trusted module that an operation or sequence of operations is to be performed. For example, the instruction can include a high value (e.g., a value of "1") provided by a GPIO pin of the host that triggers the host-trusted module to read data from the main memory of the host or the CMB of the DSD and perform one or more operations.

In block 208, the host-trusted module performs an operation, such as a predetermined or pre-programmed atomic operation, based on the instruction received from host 101. The operation may be predetermined in the sense that the host-trusted module has been previously configured or programmed to perform the operation in response to being activated by an instruction from the host. In some cases, the host-trusted module can be preloaded with one or more available operations that can be activated by different instructions received from the host. In such cases, a host may request the host-trusted module to enumerate or provide a list of the different operations that are available to be performed by the host-trusted module. In other implementations, the host may load one or more operations to the host-trusted module for future use.

As discussed above, performance of the operation may include the host-trusted module reading data from one or more memory locations in the NVM and storing the read data in a CMB (e.g., CMB 10 in FIG. 1) or storing the read data in a memory of the host-trusted module. In other implementations, the host-trusted module may instead request a processor of the DSD to read the data from the NVM and store the read data in the CMB or provide it to the host-trusted module. The host-trusted module may then modify the read data in accordance with the instruction, such as, for example, by swapping values from two different memory locations, incrementing the data, decrementing the data, or performing another predetermined operation on the data based on the instruction received from the host.

As will be appreciated by those of ordinary skill in the art, the order of blocks 202 and 204 as compared to blocks 206 and 208 may be reversed. In addition, the command to access data received in block 202 may or may not be related to the instruction received by the host-trusted module in block 206.

Figure 3A:
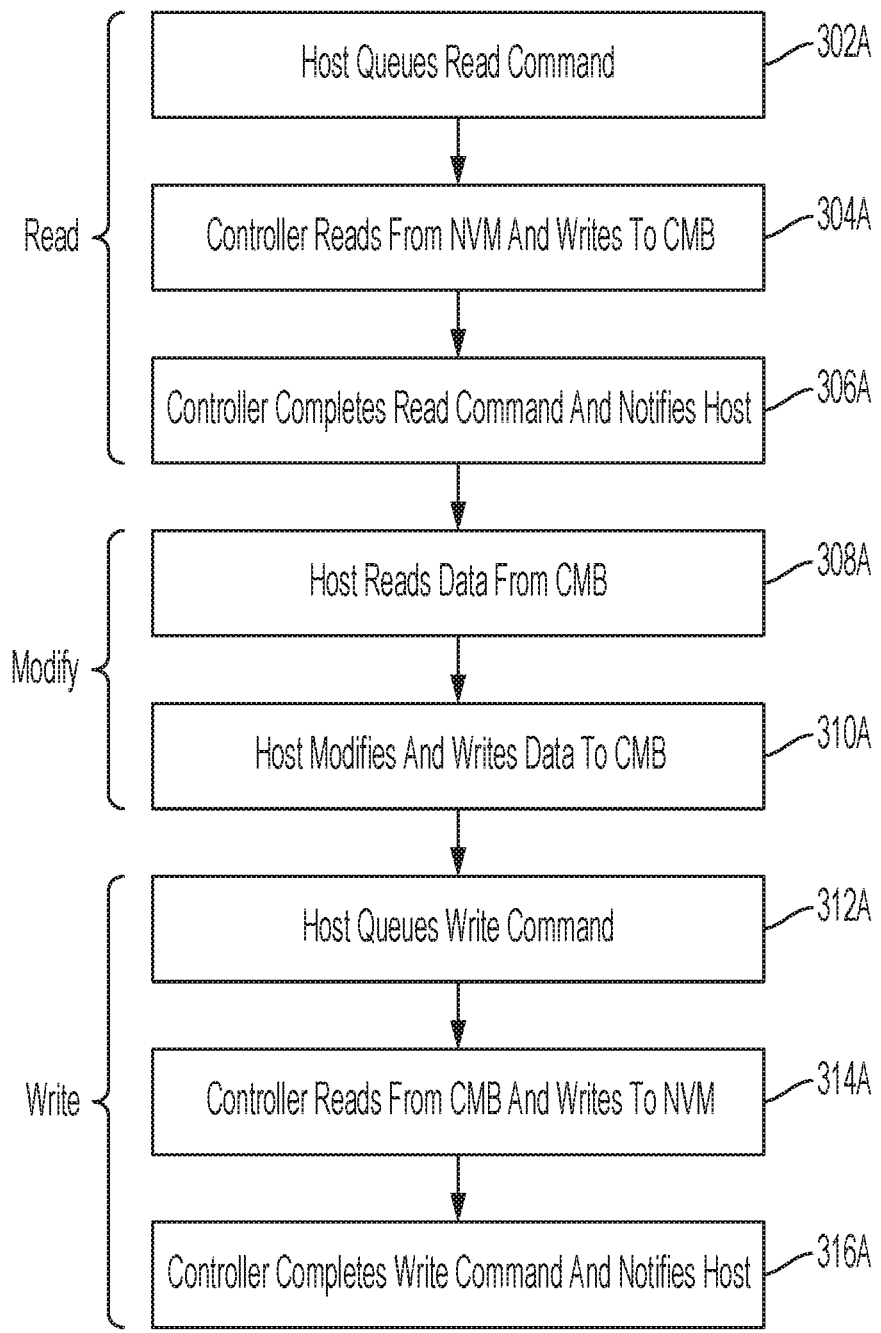
FIG. 3A is a flowchart for a prior art read-modify-write process.

FIG. 3A is a flowchart for a prior art read-modify-write process. Similar to the example of DSD 108 in FIG. 1, the prior art process shown in FIG. 3A includes the use of a CMB but does not include the use of the disclosed host-trusted module. As discussed in more detail below with comparison to the disclosed read-modify-write process of FIG. 3B, the prior art process of FIG. 3A undesirably involves the transfer of data between the host and DSD, and requires the host to modify data read from the DSD.

In block 302A, the host queues a read command for the DSD to retrieve data to be modified by the host. The controller of the DSD in block 304A reads the requested data for the read command from an NVM of the DSD, and writes the read data to a CMB of the DSD. In block 306A, the controller completes the read command and notifies the host. The foregoing blocks of 302A, 304A, and 306A comprise a read portion of the read-modify-write process of FIG. 3A.

In block 308A, the host reads the data to be modified from the CMB of the DSD to its own main memory local to the host. This involves the transfer of the data from the DSD to the host and the allocation of main memory to the transferred data. In block 310A, the host modifies the data in its main memory and writes the data back to the CMB of the DSD. The modification may include, for example, an operation performed by the host such as an XOR operation or an increment operation. Similar to reading data from the CMB of the DSD, writing the modified data back to the CMB of the DSD involves transferring the modified data from the main memory of the host to the DSD and the allocation of space in the CMB to the modified data received from the host. The foregoing blocks of 308A and 310A comprise a modify portion of the read-modify-write process of FIG. 3A. The modification of the data at the host and the transfer of the modified data back to the DSD can introduce a significant latency and add to the data traffic between the host and the DSD.

In block 312A, the host queues a write command for writing the modified data to the NVM. The controller of the DSD reads the modified data from the CMB in block 314A and writes the modified data to the NVM. In block 316A, the controller completes the write command and notifies the host of the completion of the write command. The foregoing blocks of 312A, 314A, and 316A comprise a write portion of the read-modify-write process of FIG. 3A.

Figure 3B:
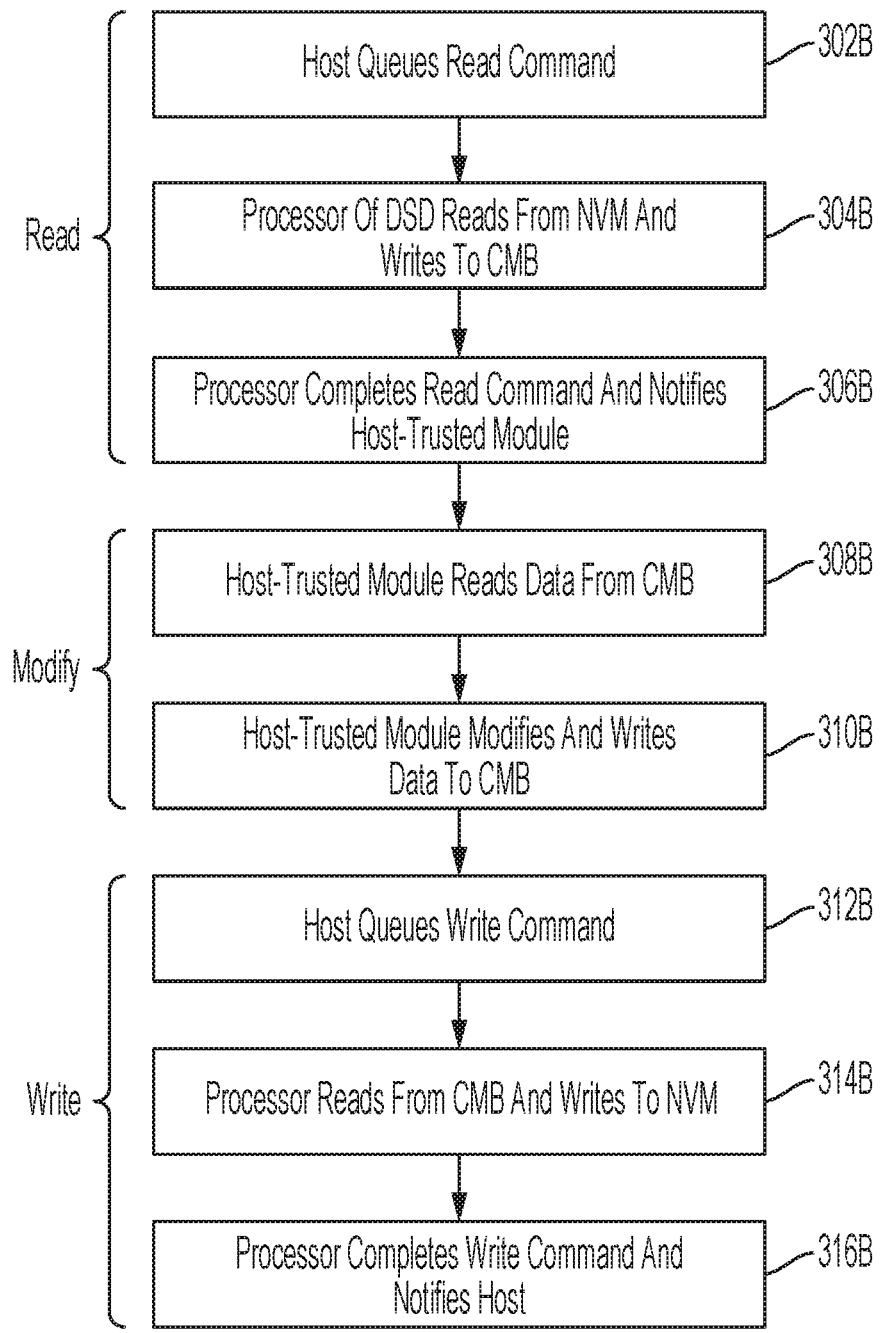
FIG. 3B is a flowchart for a read-modify-write process according to an embodiment.

FIG. 3B is a flowchart for a read-modify-write process according to an embodiment of the present disclosure. In contrast to the prior art read-modify-write process discussed above with respect to FIG. 3A, the read-modify-write process of FIG. 3B uses a host-trusted module, such as host-trusted module 114 in FIG. 1 that is local to the DSD to modify the data, thereby saving host processing resources and the transfer of data back and forth between the host and the DSD. In addition, the local processing performed by the host-trusted module at the DSD ordinarily reduces the time to complete a read-modify-write operation, as compared to the prior art process of FIG. 3A.

In block 302B, the host queues a read command to retrieve data to be modified from the DSD. The read command can also include an instruction for the host-trusted module to perform one or more operations. A processor of the DSD (e.g., processor 112 in FIG. 1) in block 304B reads the requested data for the read command from an NVM of the DSD (e.g., NVM 116 in FIG. 1) and writes the read data to a CMB of the DSD, such as CMB 10 in FIG. 1. In some implementations, the CMB may be located in a separate memory of the DSD. In other implementations, the CMB may be included as a part of the host-trusted module.

In block 306B, the processor completes the read command and notifies the host trusted module. The notification can include, for example, an indication that the read command has been completed. In contrast to the prior art example of FIG. 3A discussed above, the host-trusted module in block 306B may be notified of the completion of the read command faster than the host, as in block 306A discussed above. The foregoing blocks of 302B, 304B, and 306B comprise a read portion of the read-modify-write process of FIG. 3B.

In block 308B, the host trusted module reads the data to be modified from the CMB. In some implementations, the data stored in the CMB may include the instruction from the host for performing one or more operations. In other implementations, the notification received by the host-trusted module can provide the instruction for the host-trusted module to perform a predetermined operation.

In contrast to the prior art example of FIG. 3A discussed above, the data to be modified does not need to be transferred to the host or require the host to modify the data. In block 310B, the host-trusted module modifies the data in the CMB based on an instruction from the host. The modification may include at least one of, for example, an XOR operation, an increment or decrement operation, a value transfer operation, and an arithmetic operation. Unlike reading and modifying data from the CMB in the prior art read-modify-write process of FIG. 3A, modifying the data and writing the modified data in the CMB does not require transferring the modified data from the host to the DSD in the process of FIG. 3B. Performing the modification internally at the DSD by the host-trusted module can reduce the likelihood of overloading the interface between the host and DSD. In addition, the time for performing the modification is ordinarily reduced since it is performed locally at the DSD. The foregoing blocks of 308B and 310B comprise a modify portion of the read-modify-write process of FIG. 3B.

In block 312B, the host queues a write command for writing the modified data to the NVM. In some implementations, the host-trusted module may instead queue the write command. The processor of the DSD reads the modified data from the CMB in block 314B and writes the modified data to the NVM. In block 316B, the processor completes the write command and notifies the host of the completion of the write command. The foregoing blocks of 312B, 314B, and 316B comprise a write portion of the read-modify-write process of FIG. 3B.

As discussed above, the use of the host-trusted module to perform an operation on data stored in the NVM ordinarily reduces the time to perform the operation as compared to a prior art method of transferring the read data to the host for modification by the host and subsequent transfer of the modified data back to the DSD.

Figure 4:
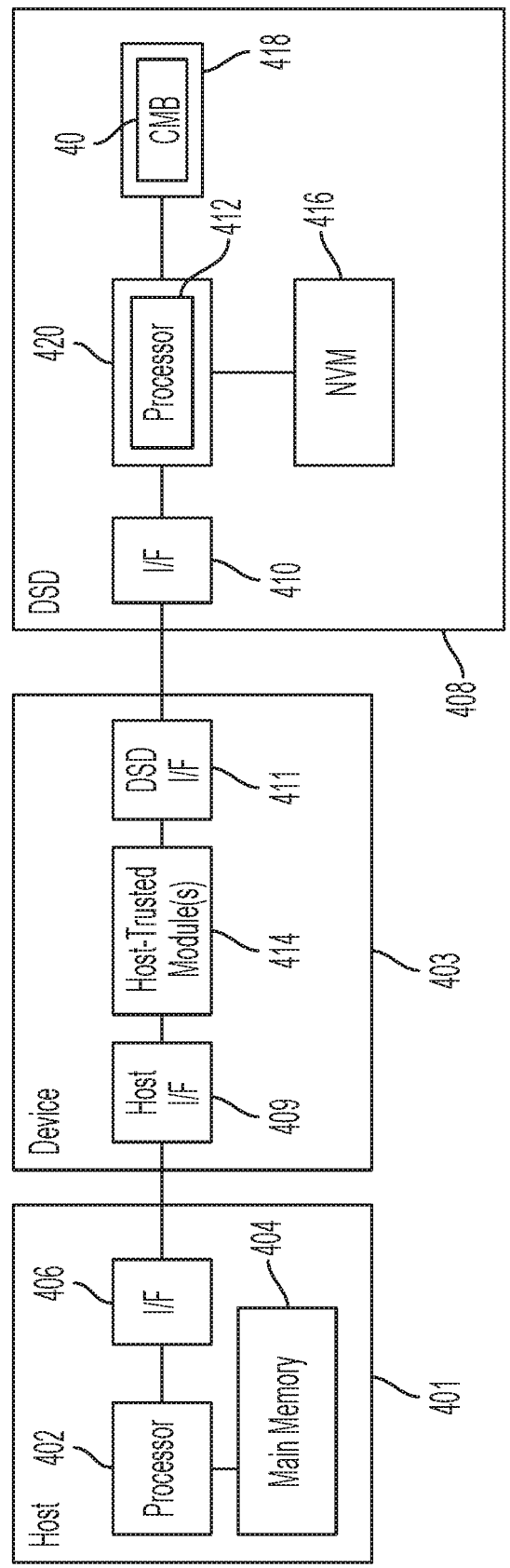
FIG. 4 is a block diagram of a host, intermediate device, and DSD according to an embodiment.

FIG. 4 is a block diagram of host 401, intermediate device 403, and DSD 408 according to an embodiment. In the example of FIG. 4, intermediate device 403 includes one or more host-trusted modules 414 for performing one or more operations on data stored in NVM 416 of DSD 408. As with the example of FIG. 1, the use of a host-trusted module closer to the DSD can ordinarily reduce the amount of data traffic between the host and the DSD and reduce the amount of time needed to perform an operation, such as an atomic operation.

As shown in the example of FIG. 4, host 401 includes processor 402, interface 406 and main memory 404, each of which substantially correspond to the description of similarly numbered processor 102, interface 106 and main memory 104 provided above for FIG. 1. In addition, DSD 408 in FIG. 4 includes processor 412, NVM 416, RAM 418, and controller 420, each of which substantially correspond to the description of similarly numbered processor 112, NVM 116, RAM 118, and controller 120 provided above for FIG. 1.

In the example of FIG. 4, intermediate device 403 includes host interface 409 for communicating with host 401 and DSD interface 411 for communicating with DSD 408. Host interface 409 and DSD interface 411 are configured to interface with host 401 and DSD 408, respectively, and may communicate using a standard such as, for example, SATA, PCIe, SCSI, SAS, Ethernet, Fibre Channel, or WiFi.

Host-trusted module or modules 414 are functionally isolated from at least a portion of DSD 408 and are configured to receive instructions from host 401 and perform one or more operations based on an instruction, such as a predetermined atomic operation to modify data stored in NVM 416. In some implementations, host-trusted module(s) 414 can include one or more RISCs, such as RISC-V processors or ARM processors, or a type of open source processor. Additionally or alternatively, host-trusted module(s) 414 may be configured to execute a high-level code, such as Java, running in a sandbox or to execute a preconfigured service, such as an XOR operation, increment or decrement operation, or transfer variable operation, installed during manufacture of intermediate device 403.

Host-trusted module or modules 414 can be functionally isolated from at least a portion of DSD 408, such as one or more registers of processor 412, portions of controller 420, and/or one or more memory locations in NVM 416 by processor 412 monitoring requests to access resources of DSD 408 from host-trusted module(s) 414 and blocking access as needed to one or more components of DSD 408. This blocking of access may, for example, provide security against unauthorized access of data stored in DSD 408 and/or protect against error-causing behavior of host 401. In some implementations, processor 412 may monitor access to DSD 408 via interface 410 at DSD 408.

Host-trusted module(s) 414 may be trusted by host 401 in that the host-trusted modules are configured to use a secure communication or authentication with host 401. For example, host-trusted module(s) 414 may be configured to use at least one of mutual authentication with host 401 and session authentication for communication between host 401 and host-trusted module(s) 414. Mutual authentication and/or session establishment can be required to gain a certain level of access and capabilities of host 401, such as kernel level access to an OS of host 401 or access to main memory 404 of host 401. A session information token may be used with each transaction to ensure protection. In addition, some host events, such as entering a sleep mode and/or a reset event, may invalidate some or all of the sessions.

In the example of FIG. 4, DSD 408 includes RAM 418 storing CMB 40, which can be accessed by host-trusted module(s) 414 for performing operations, such as in the read-modify-write process of FIG. 3B. In other implementations, CMB 40 may instead be stored in a memory local to intermediate device 403 and/or host-trusted module(s) 414.

Those of ordinary skill in the art will appreciate that other implementations of host 401 and DSD 408 in FIG. 4 can include a different arrangement of components, modules, or data structures. For example, other implementations can include a different number or arrangement of host-trusted components, as in the example of FIG. 5. As another example, other implementations may include multiple DSDs that are accessed by intermediate device 403 for performing operations on data stored in the DSDs by host-trusted module(s) 414.

Figure 5:
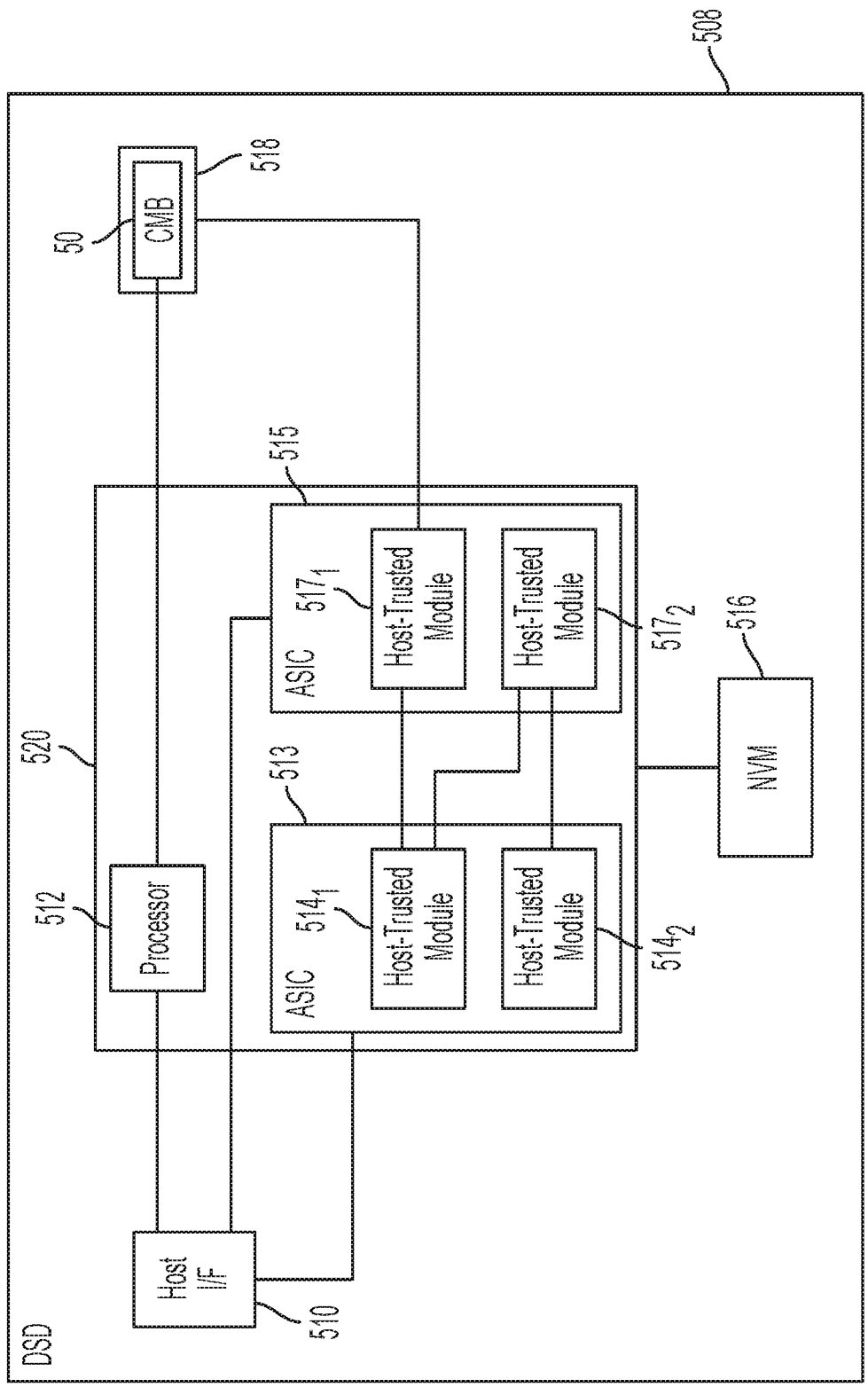
FIG. 5 is a block diagram of a DSD including multiple host-trusted modules according to an embodiment.

FIG. 5 is a block diagram of DSD 508 including multiple host-trusted modules 514 and 517 according to an embodiment. As shown in FIG. 5, DSD 508 includes host interface 510, NVM 516, and RAM 518, each of which substantially correspond to the description of similarly numbered host interface 110, NVM 116, and RAM 118 provided above for FIG. 1.

As shown in FIG. 5, controller 520 differs from controller 120 in FIG. 1 in that it includes ASICs 513 and 515, which each include multiple host-trusted modules. The host-trusted modules 514 and 517 are embedded in DSD 508, but are functionally isolated from at least a portion of DSD 508. Host-trusted modules 514 and 517 are configured to receive instructions from one or more hosts via host interface 510 and perform one or more operations, such as predetermined atomic operations to modify data stored in NVM 516, based on an instruction. In some implementations, host-trusted modules 514 and 517 can include one or more RISCs, such as RISC-V processors or ARM processors, or a type of open source processor. Additionally or alternatively, host-trusted modules 514 and 515 may be configured to execute a high-level code, such as Java, running in a sandbox or to execute a preconfigured service, such as an XOR operation, increment or decrement operation, or transfer variable operation, installed during manufacture of DSD 508.

Host-trusted modules 514 and 517 can be functionally isolated from at least a portion of DSD 508, such as one or more registers of processor 512, portions of controller 520, and/or one or more memory locations in NVM 516. In some implementations, processor 512 can monitor requests to access resources of DSD 508 from host-trusted modules 514 and 517, and block access as needed to one or more components of DSD 508. This blocking of access may, for example, provide security against unauthorized access of data stored in DSD 508 and/or error-causing behavior of a host.

Host-trusted modules 514 and 517 may be trusted by one or more hosts in that the host-trusted modules are configured to use a secure communication or authentication with the host or hosts. For example, host-trusted modules 514 and 517 may be configured to use at least one of mutual authentication with one or more hosts and session authentication for communication between a host and host-trusted module. Mutual authentication and/or session establishment can be required to gain a certain level of access and capabilities of the host, such as kernel level access to an OS of the host or access to a main memory of the host. A session information token may be used with each transaction to ensure protection. In addition, some host events, such as entering a sleep mode and/or a reset event, may invalidate some or all of the sessions.

In the example of FIG. 5, RAM 518 stores CMB 50 that host-trusted modules 514 and 517 may use to modify or otherwise perform one or more operations based on instructions received from one or more hosts. CMB 50 is a buffer that can be fully allocated to one or more hosts, and can be mapped in a memory space of a host with the host being able to send read and write requests to CMB 50. In other implementations, host-trusted modules 514 and/or 517 can include their own memories, such as SRAM, for performing operations based on instructions received from a host. In yet other implementations, one or both of ASICs 513 and 515 can include a CMB for access by one or more host-trusted modules. For example, each of ASICs 513 and 515 can include a CMB for access by local host-trusted modules 514 and 517, respectively.

In some implementations, host-trusted modules 514 and/or 517 may only be allowed to access CMB 50. Host-trusted modules 514 and/or 517 can modify the content of CMB 50 to avoid transferring data to a host. When CMB 50 is implemented in a flash memory, the host or a host-trusted module may request to actively erase data stored in CMB 50 after an operation is completed.

As shown in FIG. 5, controller 520 includes ASIC 513 and ASIC 515, which include host-trusted modules 514 and 517, respectively. In some implementations, host-trusted module $514_1$ and/or host-trusted module $514_2$ are configured to send a sub-instruction to host-trusted module $517_1$ and/or host-trusted module $517_2$ in performing an operation based on an instruction received from a host.

For example, host-trusted module $514_1$ of ASIC 513 may receive an instruction for performing an operation from a host via host interface 510. Host-trusted module $514_1$ may then perform a first part of the operation, such as a value transfer operation, and send the result as a sub-instruction to one or both of host-trusted modules $517_1$ and $517_2$ of ASIC 515 for performing a second part of the operation, such as an increment operation by host-trusted module $517_1$ and a decrement operation by host-trusted module $517_2$, for example. Such use of multiple host-trusted modules can improve a throughput for multi-operation modifications or allow for parallel processing of multiple operations.

In some implementations, each of host-trusted modules $514_1$, $514_2$, $517_1$, and $517_2$ may be associated or assigned to a particular host. In addition, the different host-trusted modules can have different levels of access to resources of DSD 508. For example, host-trusted modules $514_1$ and $514_2$ may have access to portions of NVM 516, while host-trusted modules $517_1$ and $517_2$ may only have access to CMB 50 and not to NVM 516.

Those of ordinary skill in the art will appreciate that other implementations of DSD 508 in FIG. 5 can include a different arrangement of components, modules, or data structures. For example, other implementations can include a different number of host-trusted components in each ASIC. As another example, CMB 50 may instead be stored in a memory of ASIC 513 or 515.

As discussed above, the foregoing use of host-trusted modules in a DSD ordinarily improves the performance of operations, such as atomic operations by reducing the need to transfer data between the host and the DSD. In addition to a reduction in data traffic, processing is offloaded from the host to allow for faster completion of modifications by the host-trusted module locally at the DSD.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or control circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, and modules described in connection with the examples disclosed herein may be implemented or performed with a processor or control circuitry, such as, for example, a Central Processing Unit (CPU), a Microprocessor Unit (MPU), a Microcontroller Unit (MCU), or a DSP, and can include, for example, an FPGA, an ASIC, or other programmable logic device, discrete gate or transistor logic, discrete hardware components, or any combination thereof designed to perform the functions described herein. A processor or controller may also be implemented as a combination of computing devices, e.g., a combination of a DSP and an MPU, a plurality of MPUs, one or more MPUs in conjunction with a DSP core, or any other such configuration. In some implementations, the controller or processor may form at least part of an SoC.

The activities of a method or process described in connection with the examples disclosed herein may be embodied directly in hardware, in a software module executed by a processor or control circuitry, or in a combination of hardware and software. The steps of the method or algorithm may also be performed in an alternate order from those provided in the examples. A software module may reside in RAM memory, flash memory, ROM memory, EPROM memory, EEPROM memory, other types of solid state memory, registers, hard disk, removable media, optical media, or any other form of storage medium known in the art. An exemplary storage medium is coupled to a processor or a controller such that the processor or control circuitry can read information from, and write information to, the storage medium. In the alternative, the storage medium may be integral to the processor or the control circuitry.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive.

What is claimed is:

1. A Data Storage Device (DSD), comprising:
a Non-Volatile Memory (NVM) for storing data;
a host-trusted module functionally isolated from at least a portion of the DSD; and
a processor configured to:
 receive a read command from a host to read first data in the NVM;
 perform the read command to read the first data in the NVM; and
 notify the host-trusted module that the read command has been completed; and
wherein the host-trusted module is configured to:
 receive an instruction from the host to perform a predetermined atomic operation on the first data previously read by the processor, wherein the host is separate from the processor of the DSD; and
 perform the predetermined atomic operation on the first data previously read by the processor based on the instruction received from the host, the first data on which the predetermined atomic operation is performed being previously read from the NVM by the processor in response to the read command from the host but not transferred to the host.

2. The DSD of claim 1, wherein the processor is further configured to write data resulting from the performance of the predetermined atomic operation to the NVM in response to a write command from the host.

3. The DSD of claim 1, wherein the processor is further configured to block access by the host-trusted module to at least one component of the DSD.

4. The DSD of claim 3, wherein the processor is further configured to block access by the host-trusted module to at least one of a portion of the NVM and a register of the processor.

5. The DSD of claim 1, wherein the predetermined atomic operation includes at least one of a read-modify-write operation, an XOR operation, an increment or decrement operation, a value transfer operation, and an arithmetic operation.

6. The DSD of claim 1, wherein the instruction includes a pointer to a location in a main memory of the host for the host-trusted module to access data for performing the instruction.

7. The DSD of claim 1, wherein the host-trusted module includes a Reduced Instruction Set Computer (RISC).

8. The DSD of claim 1, wherein the host-trusted module is configured to execute code running in a sandbox or to execute a service installed during manufacture of the DSD.

9. The DSD of claim 1, wherein the host-trusted module is further configured to use at least one of mutual authentication and session authentication for communication between the host and the host-trusted module.

10. The DSD of claim 1, further comprising a Controller Memory Buffer (CMB), and wherein the host-trusted module is further configured to access the CMB to perform the predetermined atomic operation.

11. The DSD of claim 1, wherein the host-trusted module includes a memory for performing the predetermined atomic operation.

12. The DSD of claim 1, further comprising one or more additional host-trusted modules functionally isolated from at least a portion of the DSD, and wherein the host-trusted module is further configured to send a sub-instruction to an additional host-trusted module in performing the predetermined atomic operation based on the instruction received from the host.

13. A method of operating a Data Storage Device (DSD), the method comprising:
  receiving, by a processor of the DSD, a read command from a host to read first data in the DSD;
  performing, by the processor, the read command to read the first data in the DSD;
  notifying, by the processor, a host-trusted module of the DSD that the read command has been completed;
  receiving, by the host-trusted module of the DSD, an instruction from the host to perform an operation on the first data previously read by the processor, wherein the host is separate from the processor of the DSD; and
  performing, by the host-trusted module, the operation on the first data previously read by the processor based on the instruction received from the host.

14. The method of claim 13, wherein the operation performed by the host-trusted module is a predetermined atomic operation to modify the first data stored in the DSD.

15. The method of claim 13, further comprising the processor blocking access to at least one component of the DSD by the host-trusted module.

16. The method of claim 15, further comprising the processor blocking access by the host-trusted module to at least one of a portion of a Non-Volatile Memory (NVM) and a register of the processor.

17. The method of claim 13, wherein the operation includes at least one of a read-modify-write operation, an XOR operation, an increment or decrement operation, a value transfer operation, and an arithmetic operation.

18. The method of claim 13, wherein the instruction includes a pointer to a location in a main memory of the host for the host-trusted module to access data for performing the instruction.

19. The method of claim 13, further comprising the host-trusted module using at least one of mutual authentication and session authentication for communication with the host.

20. The method of claim 13, further comprising the host-trusted module accessing a Controller Memory Buffer (CMB) of the DSD to perform the operation.

21. The method of claim 13, further comprising the host-trusted module sending a sub-instruction to an additional host-trusted module of the DSD in performing the operation based on the instruction received from the host.

22. A controller of a Data Storage Device (DSD), the controller comprising:
  a Controller Memory Buffer (CMB);
  a processor configured to:
    receive a read command from a host to read first data from a Non-Volatile Memory (NVM) of the DSD;
    perform the read command to read the first data from the NVM; and
    store the first data read from the NVM in the CMB; and
  a host-trusted module configured to:
    receive an instruction from the host to modify the first data previously read from the NVM by the processor; and
    perform an operation on the first data stored in the CMB by the processor based on the instruction received from the host.

* * * * *